Feb. 14, 1961   F. J. PRICE, JR   2,971,672
GASKET BOWL SEAL
Filed June 15, 1959

INVENTOR.
FREDERICK J. PRICE, JR
BY
Barlow & Barlow
ATTORNEYS

United States Patent Office 2,971,672
Patented Feb. 14, 1961

2,971,672

GASKET BOWL SEAL

Frederick J. Price, Jr., Saugus, Mass., assignor to Samuel Dane, Brookline, Mass.

Filed June 15, 1959, Ser. No. 820,457

4 Claims. (Cl. 220—81)

This invention relates to a seal at the lower portion of a bowl for containing liquid so as to prevent the liquid from escape along a refrigerating housing and the bowl and yet permits easy removal of the bowl for cleaning the parts contacted by the liquid to be sealed.

One of the objects of the invention is to provide a seal between a fixed refrigeration housing and the lower edge of a removable bowl which encircles this housing but is spaced therefrom so that the liquid contained in the bowl will not discharge along the housing or leak from below the lower edge of the bowl.

Another object of this invention is to provide a seal between the lower edge of a removable bowl and the parts with which it is associated so that liquid contained in the bowl will be prevented from escape around the lower edge of the bowl and yet this bowl is such that it may be readily removed.

Another object of this invention is to provide a simple cross-sectional shaping of a seal which will effect seal between two parts against the escape of liquid.

Another object of this invention is to provide a construction of seal to utilize the weight of the liquid to force the seal into sealing position against the escape of liquid at the seal.

With these and other objects in view, the invention consists of certain novel features of construction as will be more fully described and particularly pointed out in the appended claims.

Figure 1:
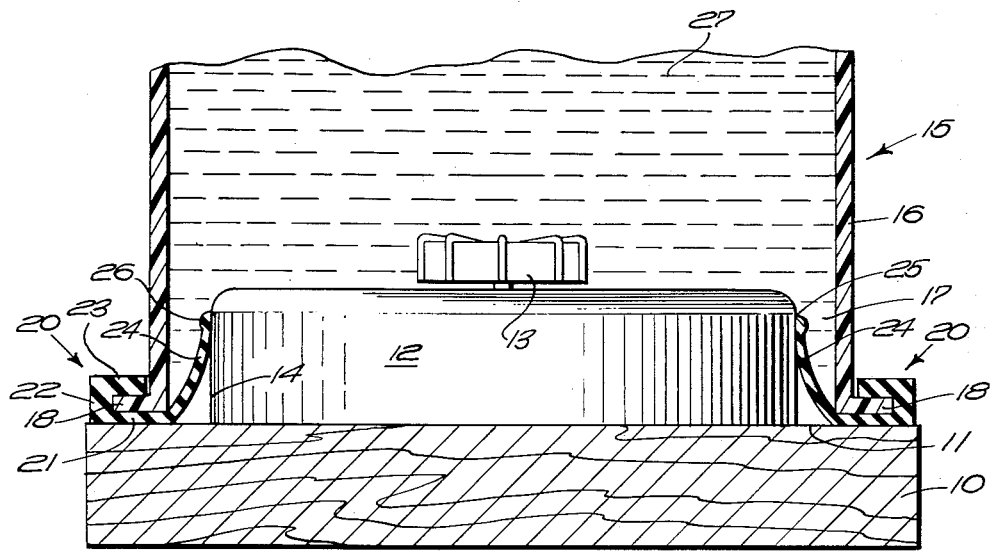
Figure 2:
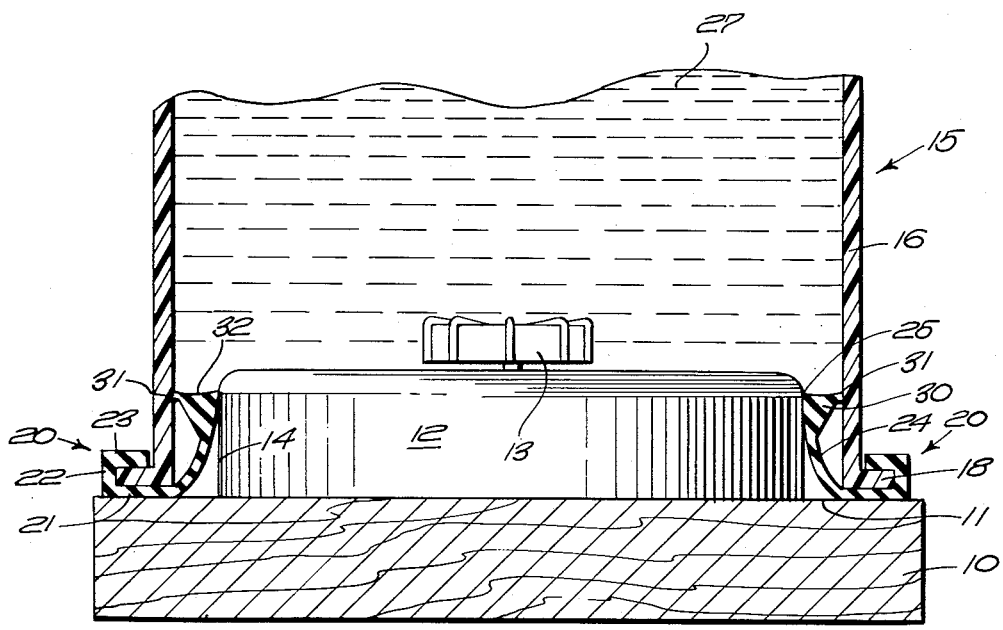

In the accompanying drawings:

Figure 1 is a sectional view of the seal as applied to the lower edge of the bowl; and Figure 2 is a sectional view of a seal slightly modified from the showing in Figure 1 to also accomplish the sealing of the lower edge of the bowl against the escape of liquid.

In proceeding with this invention, I have provided a bowl which is open at its lower edge so that it may encircle a housing which contains refrigerating mechanism, and I have flanged the lower edge of the bowl outwardly. The lower portion of the wall of the bowl encircles the refrigerating housing and is of a shape substantially the same as the vertical outer surface of the refrigerating housing so that the housing and the wall of the bowl are spaced substantially the same distance throughout the enclosing portion of the extent of the wall of the bowl. The seal is formed of some rubber or synthetic rubber material which snuggly embraces the outer flange on the bowl and then extends diagonally from the lower edge of the bowl to the vertical surface of the housing which enables the liquid to press against the surface of the gasket in such a manner as to force the gasket toward the housing. Thus, the deeper the liquid and the more pressure that exists by reason of the weight of the liquid, the tighter the gasket will be forced into engagement with the refrigerating housing.

With reference to the drawings 10 designates a counter top which conveniently may be formed of wood or there may be a covering over the counter 10. The upper surface 11 of this support is generally in a horizontal plane. A housing 12 extends above this counter top 10 usually through a hole in the counter top and contains refrigerating mechanism so that liquid which contacts this housing will be cooled. A liquid circulating rotor 13 may extend above this housing 12. This housing is formed so that its vertical surface 14 will be of any convenient shape, such for instance as circular or elliptical, and along this vertical surface 14 is one place that it is desired to prevent the seepage of liquid.

A bowl designated generally 15 has a vertical wall 16 which conforms generally to the shape of the housing 12, but this wall at its lower edge is spaced from and encloses the housing 12 leaving a substantially uniform space 17 between the wall 16 and the vertical surface 14. Extending outwardly from this vertical wall 16, there is a flange 18 which enlarges the lower edge of the wall 16 and provides an arrangement by which a gasket may be nicely secured to the lower edge of this wall 16.

The gasket designated generally 20 has a rim portion 21 extending along or beneath the lower edge of the wall 16 and the flange 18, and this gasket is provided with a hook-shape section having an upwardly extending edge 22 and an inwardly extending lip 23 to hook over this flange 18. The tongue portion 24 of the gasket 20 which extends inwardly from this rim portion 21 is of a size at its inner edge 25 smaller than the periphery of the housing which encloses the refrigerating mechanism, and the inner edge 25 of this portion 24 is stretched in order that it be positioned over the upper edge of the housing so that it will be under elastic tension tending to contract onto the housing and thus will snuggly engage the vertical surface 14 of the housing. This will cause this portion 24 to extend diagonally from the lower edge of the bowl wall 16 to the vertical surface 14 at a point above the lower edge of the bowl and thus will extend on a slant as is clearly shown in Figure 1. In order to strengthen the upper edge of the tongue portion of this gasket, it is enlarged slightly as at 26 at its upper edge.

In positioning this gasket in place, it is first attached to the lower edge of the bowl by elastically stretching it about the flange 18 with its tongue portion 24 extending inwardly. Then as the bowl is positioned in place over the housing 12, the inner edge of this tongue portion will be stretched over the housing so as to snuggly engage therewith. Thus, there will be left a space 17 between the tongue portion 24 of the gasket and the inner surface of the wall 16 and liquid may enter this area so as to press against the tongue portion 24 of the gasket forcing it toward the vertical surface 14 so as to assist in the snug engagement of the gasket with this vertical surface 14. The weight of the bowl will compress the gasket below the lower edge of the bowl and thus the compression at this point will seal the liquid against escape along the lower edge of the bowl. The greater the depth of the liquid 27 in the bowl, the more force will be applied to the tongue portion 24 of the gasket tending to force it into engagement with the vertical surface 14 and effect a good seal thereon.

In the showing in Figure 2 the gasket differs from the showing in Figure 1 in that its upper edge 30 is enlarged sufficiently so that a generally V-shape or wedge-shape formation is provided in a size so that the outer edge 31 will contact the inner vertical surface of the wall 16 of the bowl. By drawing this portion 30 between the two vertical surfaces, a concavity 32 is provided along the upper edge of this enlarged portion so that the weight of the liquid on this concave upper edge will tend to force the opposite corners of the gasket into snug relation with the vertical surface 14 and also into engagement with the inner surface of the wall 16 of the bowl.

In the case of Figure 2 the gasket will be applied to the lower edge of the bowl prior to the positioning in the bowl onto the counter 10, and then the bowl will be positioned over the housing 12 so as to stretch its inner edge onto the vertical surface 14 of the housing, but in this case the outer edge of this portion of the gasket 31 will also contact the inner surface of the wall 16 as the gasket is drawn along the vertical surface 14 and will be flexed by friction on this inner surface of the wall 16 so as to provide a generally concave upper edge, thus assuring that the wedge-shape portion 30 is under some compression at its upper edge as well as some tension in the tongue portion 24. This concavity 32 which is provided by this compression and tension provides a surface tending to expand as pressure is applied thereto by liquid entering this concavity and thus the liquid will force the opposite corners of the upper edge of the gasket into contact with both the vertical surface 14 and the inner vertical surface of the wall 16 in effect applying a wedging action and an effective seal due to the weight of the liquid thereon.

I claim:

1. A liquid seal comprising a support having a generally horizontal top surface, a housing rising from said surface and presenting a generally vertical surface, a liquid containing bowl having a generally vertical wall enclosing the vertical surface of said housing and generally uniformly spaced therefrom, a flange extending outwardly from the vertical wall of said bowl, a soft gasket having a rim portion extending beneath the lower edge of the vertical wall contacting said horizontal top surface and hooking over the outer and upper edge of the flange and a tongue portion extending upwardly along the vertical surface of said housing with its inner surface snuggly elastically gripping the housing, the opposite surfaces of the tongue portion being in contact with the liquid between the housing and said wall.

2. A liquid seal as in claim 1 wherein the tongue portion of said gasket extends from the lower edge of said wall to the vertical surface of said housing in an upward slant.

3. A liquid seal as in claim 1 wherein the tongue portion of said gasket extends from the lower edge of said wall to the vertical surface of said housing in an upward slant and the said tongue portion is enlarged at its upper edge.

4. A liquid seal as in claim 1 wherein the tongue portion of said gasket extends from the lower edge of said wall to the vertical surface of said housing in an upward slant and the said tongue portion is enlarged at its upper edge to contact the vertical wall of said bowl and to wedge between said vertical surface and said vertical wall due to the weight of the liquid thereon.

References Cited in the file of this patent

UNITED STATES PATENTS

| | | |
|---|---|---|
| 291,022 | Beaupied | Jan. 1, 1884 |
| 1,516,582 | Spalding | Nov. 25, 1924 |
| 2,096,578 | Flanagan | Oct. 19, 1937 |

FOREIGN PATENTS

| | | |
|---|---|---|
| 432,648 | Italy | Mar. 24, 1948 |
| 548,016 | Italy | Sept. 13, 1956 |
| 1,018,746 | France | Oct. 15, 1952 |